United States Patent
Luo et al.

(10) Patent No.: US 12,170,482 B2
(45) Date of Patent: Dec. 17, 2024

(54) CONTROL CIRCUIT FOR SWITCHING CONVERTER WITH MINIMUM ON-TIME AND OFF-TIME CONTROL AND WIDE DUTY RANGE

(71) Applicant: Silergy Semiconductor Technology (Hangzhou) LTD, Hangzhou (CN)

(72) Inventors: Di Luo, Hangzhou (CN); Liangwei Sun, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 205 days.

(21) Appl. No.: 17/888,645

(22) Filed: Aug. 16, 2022

(65) Prior Publication Data
US 2023/0064288 A1  Mar. 2, 2023

(30) Foreign Application Priority Data
Aug. 30, 2021  (CN) .......................... 202111003899.9

(51) Int. Cl.
*H02M 3/158*  (2006.01)
*H02M 1/00*  (2006.01)

(52) U.S. Cl.
CPC ......... *H02M 3/158* (2013.01); *H02M 1/0041* (2021.05)

(58) Field of Classification Search
CPC ................ H02M 3/158; H02M 1/0041
See application file for complete search history.

(56) References Cited

U.S. PATENT DOCUMENTS

| | | |
|---|---|---|
| 6,005,780 A | 12/1999 | Hua |
| 6,580,258 B2 | 6/2003 | Wilcox et al. |
| 9,325,254 B2 | 4/2016 | Deng et al. |
| 9,331,588 B2 | 5/2016 | Chen |
| 9,488,680 B2 | 11/2016 | Xu |
| 9,608,519 B2 | 3/2017 | Ding et al. |
| 10,348,206 B2 | 7/2019 | Luo |
| 10,666,142 B2 | 5/2020 | Vanin et al. |
| 11,296,603 B2 | 4/2022 | Luo |
| 2009/0027024 A1 | 1/2009 | Dequina |
| 2010/0265742 A1* | 10/2010 | Hu ..................... H02M 3/33523 363/21.13 |
| 2010/0301827 A1* | 12/2010 | Chen ..................... H02M 3/156 323/299 |

(Continued)

FOREIGN PATENT DOCUMENTS

| | | | |
|---|---|---|---|
| CN | 206180845 U | * | 5/2017 |
| CN | 112217380 B | | 1/2021 |

*Primary Examiner* — Harry R Behm

(57) ABSTRACT

A control circuit for a switching converter, where: in a first operation state, the control circuit controls a switching period of the switching converter to remain unchanged, controls a turn-on time of a power transistor in the switching converter to be not less than a minimum turn-on time in each switching period, and controls a turn-off time of the power transistor to be not less than a minimum turn-off time; in a second operation state, the control circuit controls the turn-on time of the power transistor to be the minimum turn-on time in each switching period, and adjusts the switching period to further reduce a duty cycle; and in a third operation state, the control circuit controls the turn-off time of the power transistor to be the minimum turn-off time in each switching period, and adjusts the switching period to further increase the duty cycle.

23 Claims, 12 Drawing Sheets

(56) References Cited

U.S. PATENT DOCUMENTS

| | | | |
|---|---|---|---|
| 2013/0257399 A1* | 10/2013 | Jiang | G05F 1/10 |
| | | | 323/271 |
| 2014/0176107 A1 | 1/2014 | Yu et al. | |
| 2014/0078789 A1 | 3/2014 | Li et al. | |
| 2014/0239934 A1 | 8/2014 | Zhang | |
| 2015/0160270 A1 | 6/2015 | Shi et al. | |
| 2015/0280578 A1 | 10/2015 | Huang et al. | |
| 2017/0338814 A1* | 11/2017 | Xu | H03K 17/284 |
| 2018/0109191 A1* | 4/2018 | Chan | H03K 17/063 |
| 2022/0216785 A1 | 7/2022 | Wu | |

\* cited by examiner

CONTROL CIRCUIT FOR SWITCHING CONVERTER WITH MINIMUM ON-TIME AND OFF-TIME CONTROL AND WIDE DUTY RANGE

RELATED APPLICATIONS

This application claims the benefit of Chinese Patent Application No. 202111003899.9 filed on Aug. 30, 2021, which is incorporated herein by reference in its entirety.

FIELD OF THE INVENTION

The present invention generally relates to the field of power electronics, and more particularly to control circuits for switching converters.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

In conventional fixed-frequency switching converters, the minimum turn-on time and minimum turn-off time of the power transistor are typically restricted, thereby limiting the range of duty cycle. Taking a buck converter under the fixed-frequency peak current control as an example, due to the limitation of the minimum turn-on time Ton_min, the minimum duty cycle in the fixed-frequency mode is Ton_min/T, where T is the switching period. If a smaller duty cycle is needed, it may be necessary to reduce the switching frequency, and a common solution is to make the switching converter work intermittently. Because the switching converter repeatedly switches between fixed frequency and non-fixed frequency, intermittent operation can be an unstable state, and the output voltage may fluctuate greatly. In addition, when the input voltage and output voltage are relatively close, the turn-off time of the main power transistor can be relatively small. For a traditional fixed-frequency control mode, when the turn-off time of the power transistor in the switching converter is less than the minimum turn-off time Toff_min, it may cause the output voltage to be too low.

Figure 1:
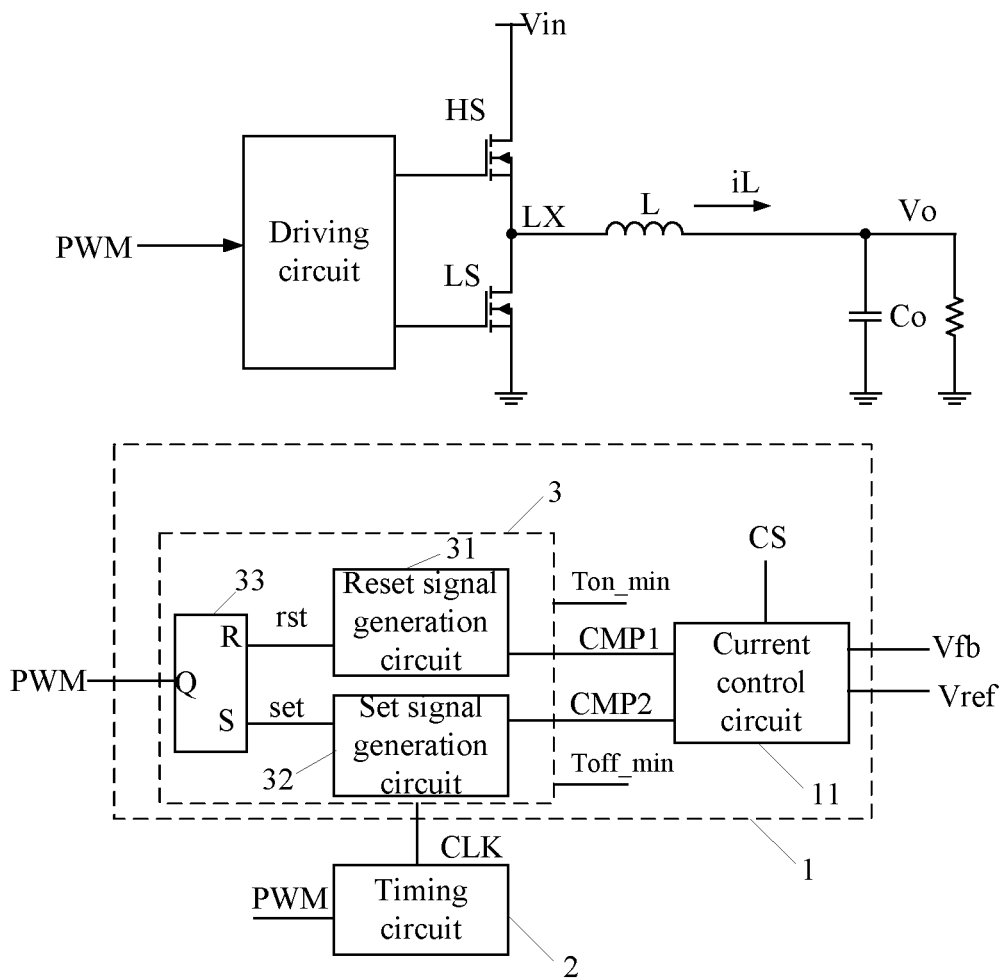
FIG. 1 is a schematic block diagram of an example control circuit, in accordance with embodiments of the present invention.

Referring now to FIG. 1, shown is a schematic block diagram of an example control circuit, in accordance with embodiments of the present invention. A common current control method can include peak current control and valley current control, and the peak current control is exemplified here. In this particular example, the switching converter is a buck converter, but any other switching converter that can adopt peak/valley current control may be utilized in certain embodiments.

The control circuit can control the switching converter to operate in a first operation state, a second operation state and a third operation state. In the first operating state, the control circuit can control a switching period of the switching converter to remain constant, and can control the turn-on time of the power transistor in the switching converter to be not less than the minimum turn-on time in each switching period, and the turn-off time to be not less than the minimum turn-off time. In the second operation state (e.g., the load is light), the turn-on time of the power transistor can be controlled to be minimum turn-on time Ton_min in each switching period, and the switching period may be adjusted to further reduce the duty cycle. In the third operation state (e.g., the load is heavy), the control circuit can control the turn-off time of the power transistor to be minimum turn-off time Toff_min in each switching period, and the switching period may be adjusted to further increase the duty cycle.

The control circuit can include feedback control circuit 1 and timing circuit 2. Feedback control circuit 1 can control the turn-on moment of the power transistor in the switching converter according to a compensation signal representing an error between feedback signal Vfb of output voltage Vo and reference signal Vref and current sampling signal CS representing inductor current iL. Feedback control circuit 1 can also control the turn-off moment of the power transistor according to the compensation signal and current sampling signal CS. For example, turn-on time of the power transistor is not less than minimum turn-on time Ton_min, and the turn-off time is not less than minimum turn-off time Toff_min. Timing circuit 2 can activate clock signal CLK when the timing time reaches a predetermined time in each switching period and transmit clock signal CLK to feedback control circuit 1. In this example, timing circuit 2 can be controlled by switching control signal pulse-width modulation (PWM) to be cleared to zero in each switching period, where switching control signal PWM can control the turn-on and turn-off of the power switch.

For example, feedback control circuit 1 can include current control circuit 11 and PWM generation circuit 3. Current control circuit 11 can generate the compensation signal according to an error between feedback signal Vfb and reference signal Vref, and then can compare the compensation signal against current sampling signal CS to generate comparison signals CMP1 and CMP2. In one example, the current sampling signal that changes synchronously with inductor current iL in the entire switching period may be obtained. For example, current iL flowing through inductor L can be directly sampled to obtain current sampling signal CS, or a triangular wave signal that changes synchronously with inductor current iL may be generated as current sampling signal CS. In this case, comparison signal CMP2 can be equal to comparison signal CMP1. In another example, the current sampling signal may be obtained by sampling the current flowing through the power transistor, and the current sampling signal can include current sampling signal CS1 representing the inductor current in the rising phase and current sampling signal CS2 representing the inductor current in the falling phase. In this case, current sampling signal CS is formed by both current sampling signal CS1 and current sampling signal CS2, comparison signal CMP1 can be generated by comparing current sampling signal CS1 against the compensation signal, and comparison signal CMP2 may be generated by comparing current sampling signal CS2 against the compensation signal.

In this example, PWM generation circuit 3 may generate switching control signal PWM according to comparison signal CMP1, comparison signal CMP2 and clock signal CLK. In addition, PWM generation circuit 3 may also be limited by minimum turn-on time Ton_min and minimum turn-off time Toff_min, such that the minimum turn-on time of the power transistor in the buck converter is not less than Ton_min, and the minimum turn-off time is not less than minimum turn-off time Toff_min. For example, PWM generation circuit 3 can include reset signal generation circuit 31, set signal generation circuit 32, and RS flip-flop 33. Reset signal generation circuit 31 can generate reset signal rst at least according to comparison signal CMP1, and set signal generation circuit 32 may generate set signal set at least according to comparison signal CMP2. In different current control modes, reset signal generation circuit 31 and set signal generation circuit 32 can be controlled by at least one of clock signal CLK, minimum turn-on time Ton_min, and minimum turn-off time Toff_min. RS flip-flop 33 can activate switching control signal PWM according to set signal set, in order to control main power transistor HS to be turned on and synchronous transistor LS to be turned off, and may deactivate switching control signal PWM according to reset signal rst to control main power transistor HS to be turned off and synchronous switch LS to be turned on. It should be understood that synchronous transistor LS can alternatively be a diode in some cases.

It should be noted here that the current control mode of the switching converter can include a peak current mode and a valley current mode. In the peak current mode, when the buck converter is in the first operation state (e.g., fixed frequency operation), when current sampling signal CS is greater than the compensation signal, main power transistor HS can be controlled to be turned off, and main power transistor HS can be controlled to be turned on by clock signal CLK. In the valley current mode, when the buck converter is in the first operation state (e.g., constant frequency operation), when current sampling signal CS is less than the compensation signal, main power transistor HS can be controlled to turn on, and main power transistor HS may be controlled to be turned off by clock signal CLK. Therefore, in the peak current mode, timing circuit 2 can be controlled by the rising edge of switching control signal PWM to reset and start timing. That is, timing circuit 2 can be controlled to start timing from zero when main power transistor HS is turned on in each switching period, and when the timing time reaches a predetermined time, clock signal CLK can be active. In the valley current mode, timing circuit 2 may be controlled by the falling edge of switching control signal PWM (that is, the rising edge of the inverse signal of switching control signal PWM) to reset and start timing. That is, timing circuit 2 can be controlled to start timing from zero when main power transistor HS is turned off in each switching period, and when the timing time reaches the predetermined time, clock signal CLK may be active.

In the peak current mode, reset signal rst generated by reset signal generation circuit 31 can be active when comparison signal CMP1 is active and the turn-on time of main power transistor HS meets minimum turn-on time Ton_min (e.g., the turn-on time is not less than minimum turn-on time Ton_min). Set signal set generated by set signal generation circuit 32 can be active when clock signal CLK is active (e.g., the timing time reaches the predetermined time), the turn-off time of main power transistor HS meets minimum turn-off time Toff_min (e.g., the turn-off time is not less than minimum turn-off time Toff_min) and comparison signal CMP2 is inactive. In the valley current mode, set signal set generated by set signal generation circuit 32 can be active when comparison signal CMP2 is active and the turn-off time of main power transistor HS meets minimum turn-off time Toff_min, in order to control main power transistor HS to be turned on. Reset signal rst generated by reset signal generation circuit 31 can be active when clock signal CLK is active (e.g., the timing time reaches the predetermined time), the turn-on time of main power transistor HS meets minimum turn-on time Ton_min, and comparison signal CMP1 is inactive. In addition, the control circuit can also include a driving circuit for receiving switching control signal PWM and generating the driving signals to drive each power transistor in the switching converter.

Figure 2:
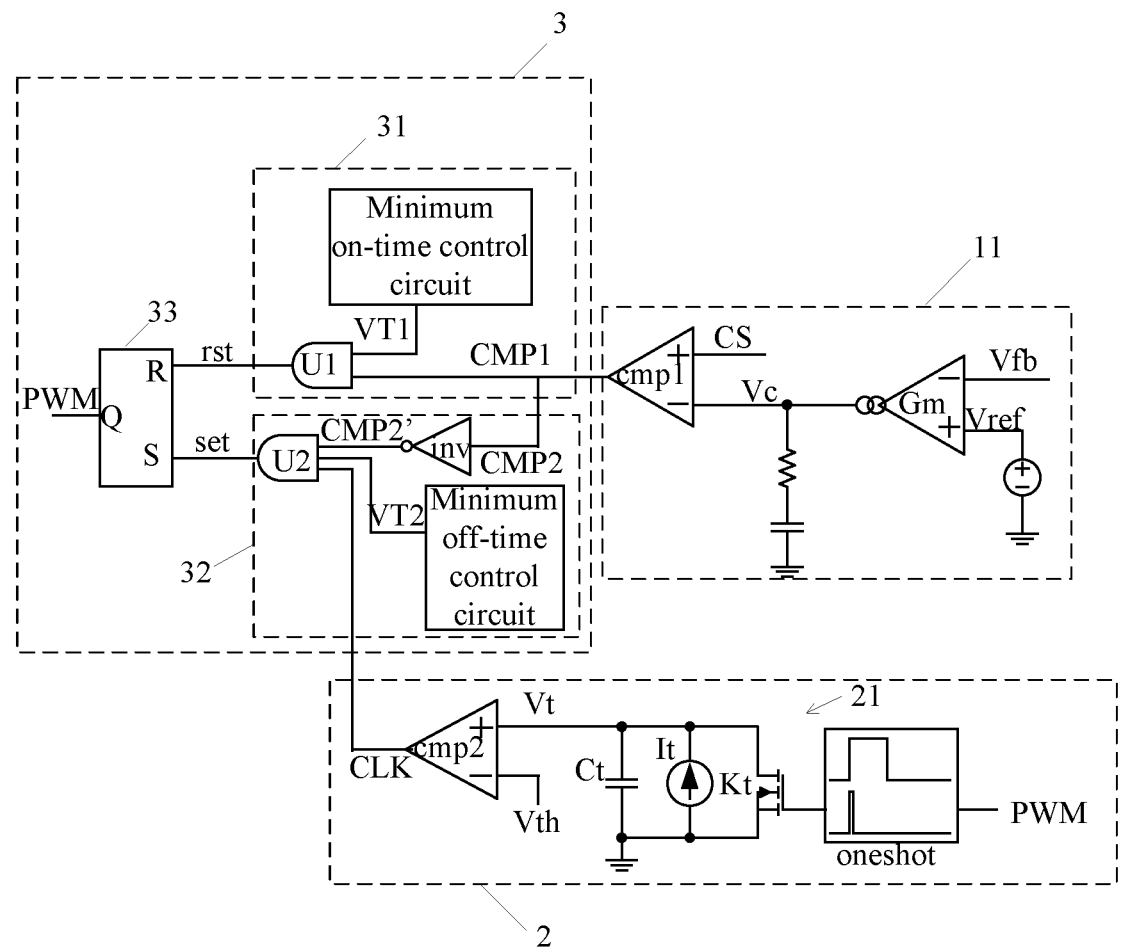
FIG. 2 is a circuit diagram of a first example control circuit, in accordance with embodiments of the present invention.

Referring now to FIG. 2, shown is a circuit diagram of a first example control circuit, in accordance with embodiments of the present invention. In this example, current sampling signal CS that changes synchronously with inductor current iL in the fall switching period may be obtained in the peak current mode as an example. The control circuit can include current control circuit 11, timing circuit 2, and PWM generation circuit 3. Current control circuit 11 can include error amplifier Gm for acquiring the error between feedback signal Vfb representing output voltage Vo and reference signal Vref, and may generate compensation signal Vc after compensation. Current control circuit 11 can also include comparator cmp1 for comparing current sampling signal CS against compensation signal Vc to generate comparison signals CMP1 and CMP2. In this example, comparison signals CMP1 and CMP2 can essentially be the same signal, and when current sampling signal CS is greater than compensation signal Vc, both comparison signals CMP1 and CMP2 can be active.

Timing circuit 2 can include timing signal generation circuit 21 and comparator cmp2. For example, timing signal generation circuit 21 may start timing when main power transistor HS is turned on in each switching period, and can generate timing signal Vt representing the timing time. Comparator cmp2 can compare timing signal Vt against threshold signal Vth, where threshold signal Vth represents the predetermined time. When timing signal Vt reaches threshold signal Vth, this can indicate that the timing time reaches the predetermined time; that is, clock signal CLK is active. In this example, timing signal generation circuit 21 can control capacitor Ct to be discharged to zero when the main power transistor is turned on in each switching period, and then can control capacitor Ct to be charged by current source "It," thereby generating timing signal Vt across capacitor Ct. In one example, timing signal generation circuit 21 can include capacitor Ct, current source It, and switch Kt connected in parallel. Timing signal generating circuit 21 can also include single-pulse trigger oneshot, where single-pulse trigger oneshot is triggered by the rising edge of switching control signal PWM, in order to generate a pulse signal to control switch Kt to be turned on. It should be understood that other circuits that can realize the periodic timing function may also be utilized in certain embodiments.

PWM generation circuit 3 can include reset signal generation circuit 31, set signal generation circuit 32, and RS flip-flop 33. For example, reset signal generation circuit 31 can include a minimum on-time control circuit for controlling the turn-on time of main power transistor HS to meet minimum turn-on time Ton_min, and to generate an active minimum on-time detection signal VT1 when the actual turn-on time reaches Ton_min, and AND-gate circuit U1, which may activate reset signal rst when both minimum on-time detection signal VT1 and comparison signal CMP1 are active, in order to control the main power transistor to be turned off. Set signal generation circuit 32 can include inverter inv for receiving comparison signal CMP2 and inverting it to generate signal CMP2', a minimum off-time control circuit for controlling the turn-off time of the main power transistor to meet minimum turn-off time Toff_min, and generating active minimum off-time detection signal VT2 when the actual turn-off time reaches Toff_min, and AND-gate circuit U2 for receiving signal CMP2', minimum off-time detection signal VT2, and clock signal CLK, and when all these three signals are active, set signal set can be active to control main power transistor HS to be turned on.

Thus in particular embodiments, set signal set may not only be controlled by clock signal CLK and minimum turn-off time Toff_min, but also can be controlled by the inverted signal of comparison signal CMP2. RS flip-flop 33 may activate switching control signal PWM according to set signal set to control main power transistor HS to be turned on, and to generate inactive switch control signal PWM according to reset signal rst to control main power transistor HS to be turned off. It should be understood that the control circuit can also include a current sampling circuit to obtain the current sampling signal, which may be integrated in the chip of the control circuit or placed outside the chip of the control circuit.

Figure 3:
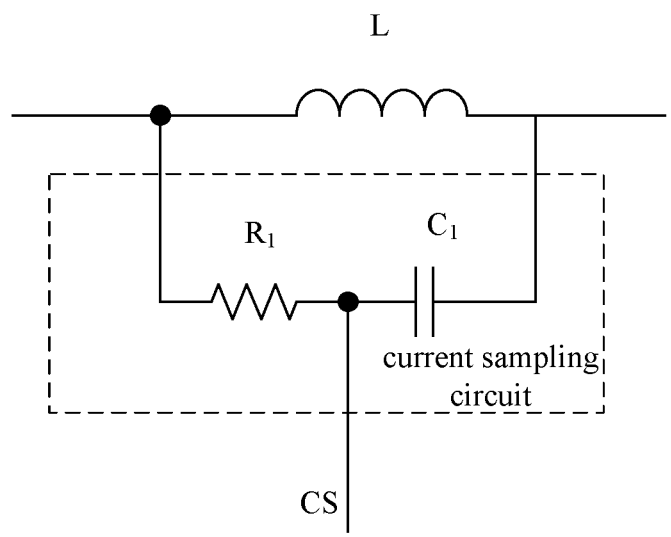
FIG. 3 is a circuit diagram of an example current sampling circuit in the control circuit, in accordance with embodiments of the present invention.

It should also be understood that there are various ways of sampling the inductor current in certain embodiments. For example, inductor current can be sampled directly, or the inductor current can be characterized by generating a triangular wave signal synchronized with the inductor current, as shown in FIG. 3. The current sampling circuit can connect in parallel at both ends of inductor L, which can include resistor R1 and capacitor C1 connected in series to generate a triangular wave signal synchronized with inductor current I1 at the common terminal of resistor R1 and capacitor C1 as current sampling signal CS. It should be understood that other circuits capable of generating a signal that changes synchronously with the inductor current may also be supported in certain embodiments.

Figure 4:
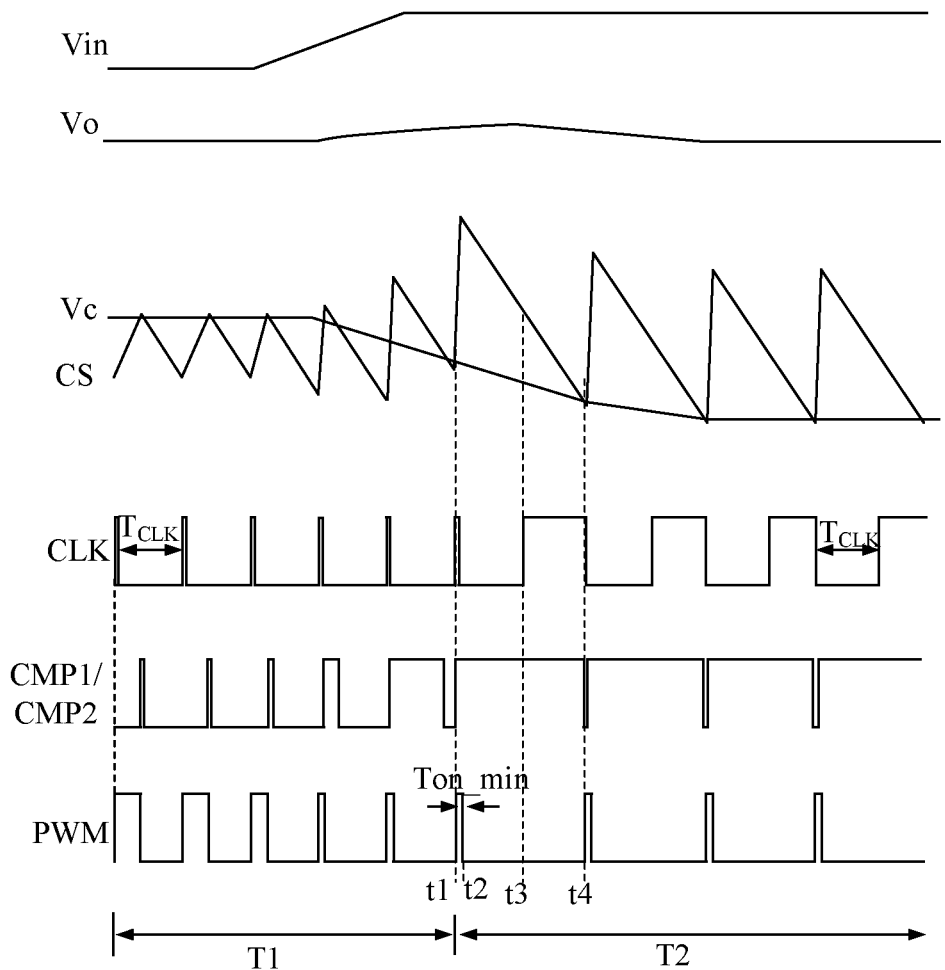
FIG. 4 is a waveform diagram of example operation of the first control circuit with the minimum turn-on time, in accordance with embodiments of the present invention.

Referring now to FIG. 4, shown is a waveform diagram of example operation of the first control circuit with the minimum turn-on time, in accordance with embodiments of the present invention. In this example, the entire operating process is divided into two intervals: interval T1 and interval T2. In interval T1, the buck converter operates in the fixed frequency mode (i.e., the first operation state), while in interval T2, the buck converter operates in the variable frequency mode (i.e., the second operation state).

In interval T1, when clock signal CLK is active, current sampling signal CS is less than compensation signal Vc, so inverted signal CMP2' of comparison signal CMP2 can be active, and the turn-off time may satisfy the minimum turn-off time, so switching control signal PWM can be set at a high level when clock signal CLK is active. That is, in this stage, comparison signal CMP2 may have no influence on the set of switching control signal PWM, and the turn-on moment of the main power transistor can be controlled by clock signal CLK. When current sampling signal CS is greater than compensation signal Vc, comparison signal CMP1 can be active, and since minimum on-time detection signal VT1 is active, reset signal rst may be active to reset switching control signal PWM at a low level. That is, the turn-off moment of the main power transistor may be determined by the comparison result between compensation signal Vc and current sampling signal CS. Further, the main power transistor can be turned off when current sampling signal CS is greater than compensation signal Vc.

As input voltage Vin increases and becomes much greater than output voltage Vo, the buck converter enters interval T2. Initially, since the buck converter may only operate under minimum turn-on time Ton_min, output voltage Vo may become high, feedback signal Vfb may increase, and thus compensation signal Vc may decrease, as shown in FIG. 4. Taking one switching period as an example, at time t1, switching control signal PWM can be set at a high level, the timer in the minimum on-time control circuit may start timing, the main power transistor can be turned on, the synchronous transistor may be turned off, and the inductor current can rise. When current sampling signal CS is greater than compensation signal Vc, the turn-on time has not yet reached minimum turn-on time Ton_min, so the main power transistor may remain turned on. Then, current sampling signal CS can continue to rise until time t2. At this time, the turn-on time of the main power transistor may reach minimum turn-on time Ton_min, so minimum on-time detection signal VT1 can be active. Therefore, reset signal rst may be generated to control the main power transistor to be turned off and the synchronous transistor to be turned on. After that, the inductor current can begin to drop. When clock signal CLK is active at time t3, current sampling signal CS may remain greater than compensation signal Vc, and comparison signal CMP2 may remain active, so that clock signal CLK may not trigger the generation of set signal set, and thereafter clock signal CLK may remain at a high level.

Until time t4, when current sampling signal CS drops below compensation signal Vc, comparison signal CMP2 is inactive, inverted signal CMP2' can be active, and minimum off-time detection signal VT2 and clock signal CLK may be active, thereby generating set signal set. At this time, the switching period can be greater than predetermined time TCLK Then, switching control signal PWM may go from low to high by set signal set, thereby resetting the timing circuit, and clock signal CLK can go low to restart timing. As shown, the switching frequency gradually decreases, and finally output voltage Vo returns to the steady state. That is, in interval T2, clock signal CLK may be equivalent to being shielded, and the main power transistor can be controlled to be turned on according to the comparison result between the current sampling signal and the compensation signal. In this particular example, when current sampling signal CS is less than compensation signal Vc, the main power transistor can be turned on, and when the turn-on time reaches minimum turn-on time Ton_min, the main power transistor may be turned off.

Figure 5:
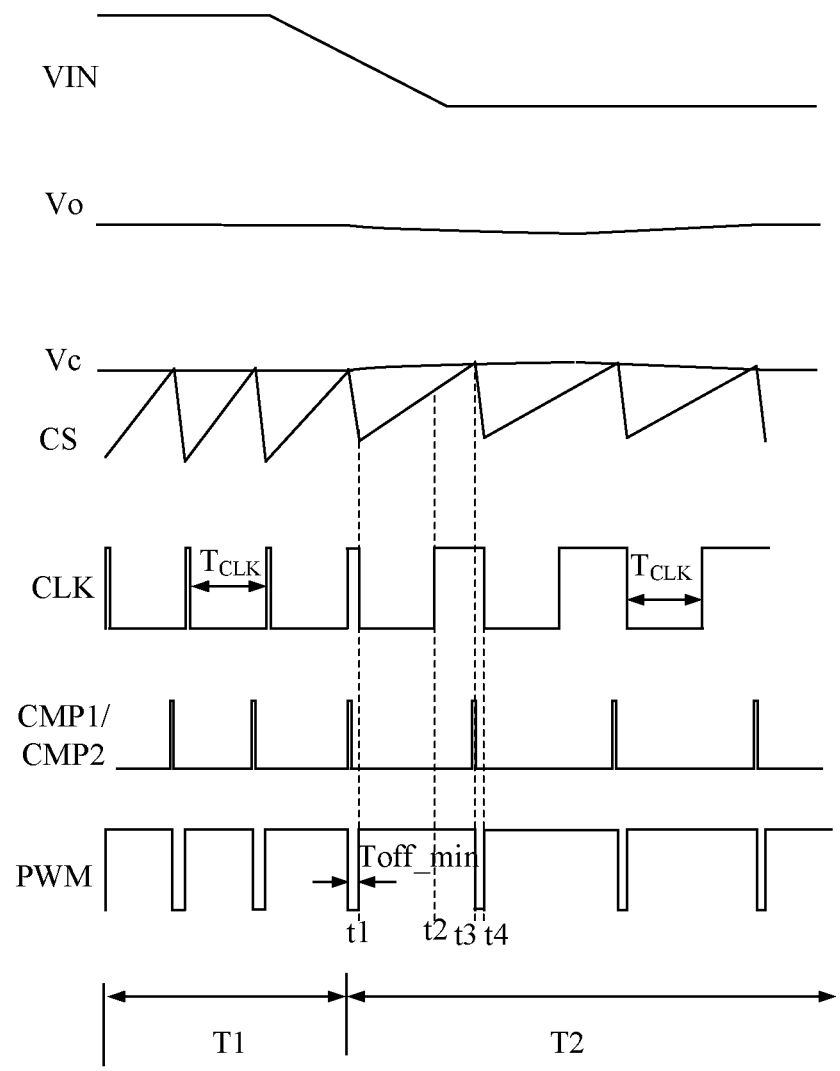
FIG. 5 is a waveform diagram of example operation of the first control circuit with the minimum turn-off time, in accordance with embodiments of the present invention.

Referring now to FIG. 5, shown is a waveform diagram of example operation of the first control circuit with the minimum turn-off time, in accordance with embodiments of the present invention. Similarly, the entire operating process is divided into two intervals: interval T1 and interval T2. In interval T1, the buck converter operates in the fixed frequency mode (i.e., the first operation state); in interval T2, the buck converter operates in the variable frequency mode (i.e., third operation state). As input voltage Vin decreases, gradually approaching output voltage Vo, the converter enters interval T2. At first, since the buck converter may only operate with minimum turn-off time Toff_min, output voltage Vo can decrease. Thus, feedback signal Vfb can decrease, and compensation signal Vc may increase. In this example, one switching period is taken as an example. At time t1, when switching control signal PWM goes from low to high, the main power transistor can be turned on, the synchronous transistor turned off, and the inductor current may rise. Since input voltage Vin and output voltage Vo are relatively close, the rising slope of current sampling signal CS can decrease.

At time t2, the timing time can reach the predetermined time, and thus clock signal CLK may be active. However, current sampling signal CS may remain less than compensation signal Vc at this time, so reset signal rst may not be triggered to be active, and thus main power transistor may remain turned on, and clock signal CLK may remain active. When current sampling signal CS rises to be greater than compensation signal Vc at time t3, reset signal rst can be active since minimum on-time detection signal VT1 is also active, such that switching control signal PWM goes from high to low, and the main power transistor can be turned off. Then, current sampling signal CS may start to fall, and the timer in the minimum off-time control circuit may start timing. At time t4, the turn-off time of the main power transistor can reach minimum turn-off time Toff_min, so off-time detection signal VT2 can be active. Also, comparison signal CMP2 can be inactive and clock signal CLK may remain active, such that set signal set is active and switching control signal PWM can be high.

As can be seen from FIG. 5, the switching period is greater than predetermined time TCLK When switching control signal PWM is set high, the timing circuit can be reset, and clock signal CLK may be low, and the timing can be restarted. Also, the switching frequency may gradually decrease, and finally output voltage Vo can return to the steady state. That is, in interval T2, the turn-off moment of the main power transistor may be determined by the comparison result of current sampling signal CS and compensation signal Vc. For example, the main power transistor can be turned off when current sampling signal CS is greater than compensation signal Vc, and when the turn-off time reaches minimum turn-off time Toff_min, the main power transistor can be controlled to be turned on; that is, clock signal CLK may be equivalent to being shielded.

In particular embodiments, the turn-on moment and turn-off moment of the power transistor may all be controlled by the comparison result of the compensation signal that represents the error signal and the current sampling signal. In addition, the clock signal can be controlled by the switching control signal. Therefore, adaptive frequency reduction may be realized under the limit of the minimum turn-on time to achieve a smaller duty cycle, and adaptive frequency reduction may be realized under the limit of the minimum turn-off time to achieve a larger duty cycle.

Figure 6:
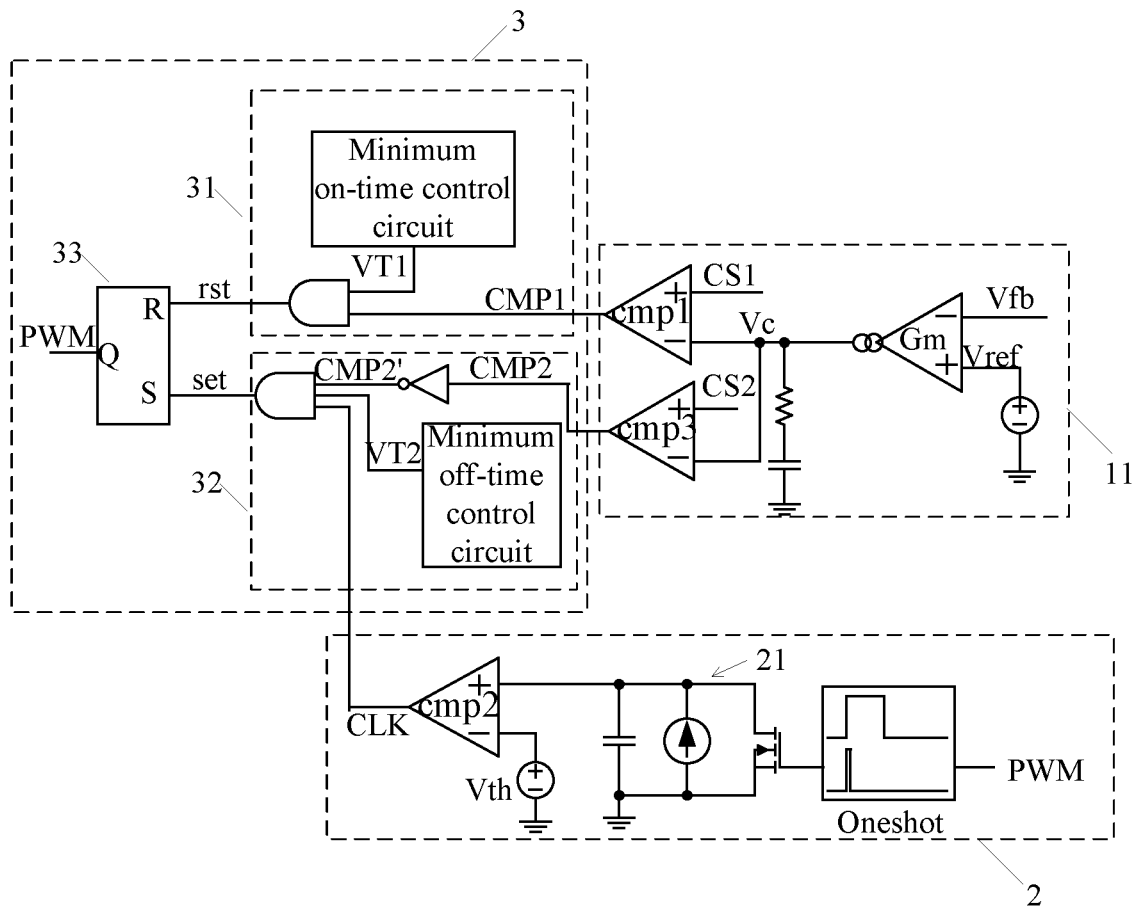
FIG. 6 is a circuit diagram of a second example control circuit, in accordance with embodiments of the present invention.

Referring now to FIG. 6, shown is a circuit diagram of a second example control circuit, in accordance with embodiments of the present invention. The above-mentioned first example control circuit is illustrated by acquiring current sampling signal CS that changes synchronously with inductor current iL in the full switching period. In this example, the inductor current can be characterized by sampling the current flowing through the power transistors, and the buck converter is exemplified. During the turn-on period of main power transistor HS (e.g., the rising stage of inductor current iL), the current flowing through main power transistor HS can be sampled to obtain current sampling signal CS1, and during the turn-on period of synchronous transistor LS (e.g., the falling stage of inductor current iL), the current flowing through synchronous transistor LS may be sampled to obtain current sampling signal CS2, such that inductor current iL can be characterized according to current sampling signals CS1 and CS2 together.

In this particular example, current control circuit 11 can include error amplifier Gm, comparator cmp1, and comparator cmp3. Here, error amplifier Gm can obtain the error between feedback signal Vfb and reference signal Vref, and may generate compensation signal Vc at the output terminal after compensation. Comparator cmp1 can compare current sampling signal CS1 against compensation signal Vc, in order to generate comparison signal CMP1, where comparison signal CMP1 is active when current sampling signal CS1 is greater than compensation signal Vc. Comparator cmp2 can compare current sampling signal CS2 against compensation signal Vc, in order to generate comparison signal CMP2, where comparison signal CMP2 is active when current sampling signal CS2 is greater than compensation signal Vc.

Figure 7:
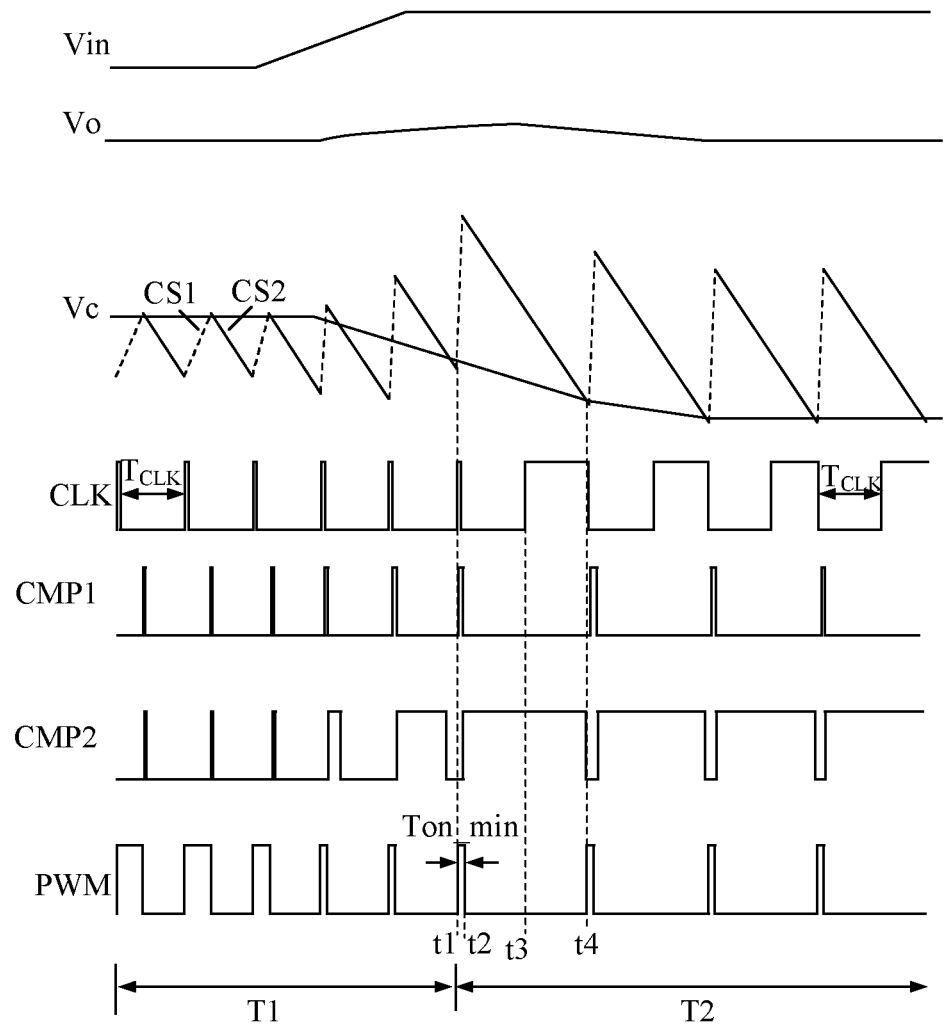
FIG. 7 is a waveform diagram of example operation of the second control circuit with the minimum turn-on time, in accordance with embodiments of the present invention.

Referring now to FIG. 7, shown is a waveform diagram of example operation of the second control circuit with the minimum turn-on time, in accordance with embodiments of the present invention. As compared with the waveform diagram shown in FIG. 4, here current sampling signal CS can include current sampling signal CS1 (indicated by a dotted line) and current sampling signal CS2 (indicated by a solid line). Also, comparison signal CMP1 can be active when current sampling signal CS1 is greater than compensation signal Vc, and comparison signal CMP2 is active when current sampling signal CS2 is greater than compensation signal Vc. Other operating waveforms are substantially the same. Likewise, the whole operating process is divided into interval T1 (i.e., first operation state) for fixed frequency operation and interval T2 (i.e., the second operation state) for variable frequency operation.

In interval T1, when clock signal CLK is active, current sampling signal CS2 is less than compensation signal Vc, so inverted signal CMP2' of comparison signal CMP2 can be active, and minimum off-time detection signal VT2 may be active, so switching control signal PWM can be at a high level when clock signal CLK is active. That is, in this interval, comparison signal CMP2 may have no influence on the set of switching control signal PWM, and the turn-on moment of the main power transistor can be controlled only by clock signal CLK. When current sampling signal CS1 is greater than compensation signal Vc, since minimum on-time detection signal VT1 is active, reset signal rst can be active to make switching control signal PWM at a low level, thereby maintaining output voltage Vo as unchanged. That is, the turn-off moment of the main power transistor may be determined by the comparison result between compensation signal Vc and current sampling signal CS1. For example, the main power transistor can be turned off when current sampling signal CS1 is greater than compensation signal Vc.

In interval T2, at time t1, when switching control signal PWM is set high, the timer in the minimum on-time control circuit may start timing, and simultaneously the main power transistor can be turned on, the synchronous transistor turned off, and the inductor current (e.g., current sampling signal CS1) can rise. When current sampling signal CS1 is greater than compensation signal Vc, the turn-on time of the main power transistor may have not yet reached minimum turn-on time Ton_min, so the main power transistor may remain turned on, and current sampling signal CS1 can continue to rise until time t2. When the turn-on time of the main power transistor reaches Ton_min, minimum on-time detection signal VT1 may be active, so reset signal rst can control the main power transistor to be turned off, and the synchronous transistor to be turned on. Then, the inductor current may start falling, and current sampling signal CS2 may start to function. At time t3, when clock signal CLK is active, current sampling signal CS2 may remain greater than compensation signal Vc, so comparison signal CMP2 may remain active, such that clock signal CLK may not trigger the set signal to be active, and thereafter clock signal CLK may remain at a high level.

Until time t4, when current sampling signal CS2 drops below compensation signal Vc, comparison signal CMP2 can be inactive, inverted signal CMP2' may be active, and minimum off-time detection signal VT2 and clock signal CLK can be active at this time, such that set signal set may be generated. At this point, the switching period can be greater than predetermined time TCLK. In addition, switching control signal PWM may go from low to high according to set signal set, thereby resetting the timing circuit, and clock signal CLK can be low to restart timing. As shown, the switching frequency gradually decreases, and finally output voltage Vo returns to the steady state. That is, in interval T2, clock signal CLK can be equivalent to being shielded, and the turn-on moment of the main power transistor may be determined by the comparison result between the current sampling signal and the compensation signal. For example, the main power transistor can be turned on when current sampling signal CS2 is less than compensation signal Vc, and may be turned off when the turn-on time of the main power transistor reaches minimum turn-on time Ton_min. In this way, regardless of sampling the current flowing through the power transistor or obtaining the current sampling signal that is synchronized with the inductor current in the fall switching period may not have a substantial effect on the control.

Figure 8:
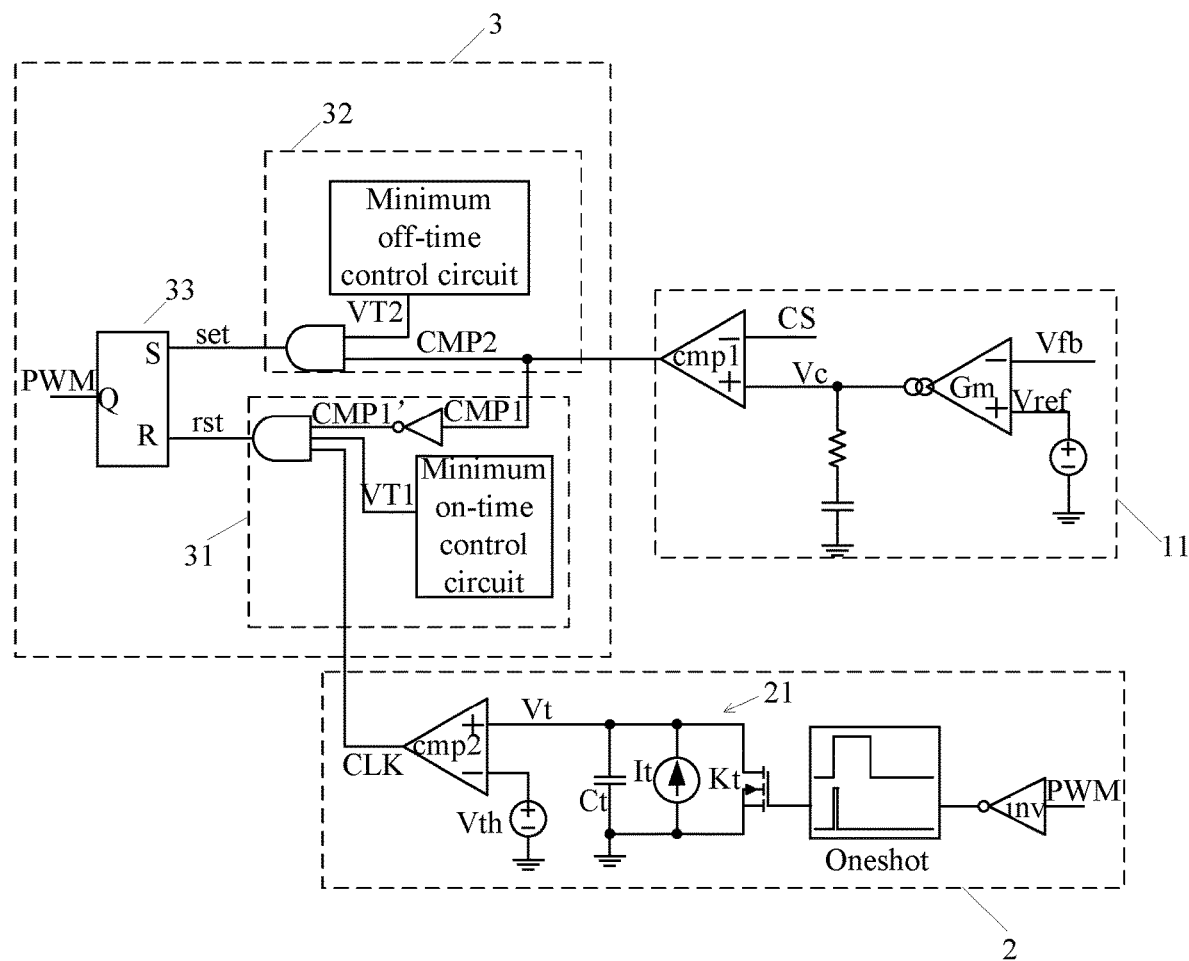
FIG. 8 is a circuit diagram of a third example control circuit, in accordance with embodiments of the present invention.

Referring now to FIG. 8, shown is a circuit diagram of a third example control circuit, in accordance with the embodiments of the present. In this particular example, current sampling signal CS that changes synchronously with inductor current iL in the full switching period can be obtained in the valley current mode. As compared with the first control circuit shown in FIG. 2, here comparison signals CMP1 and CMP2 can be active when compensation signal Vc is greater than current sampling signal CS. Also, set signal generation circuit 32 can generate set signal set when comparison signal CMP2 is active and the turn-off time of the main power transistor meets minimum off-time Toff_min, in order to control the main power transistor to be turned on. Also, reset signal generation circuit 31 can be controlled by clock signal CLK, minimum turn-on time Ton_min and comparison signal CMP1, and may generate reset signal rst when comparison signal CMP1 is inactive, the turn-on time of the main power transistor meets minimum turn-on time Ton_min, and clock signal CLK is active (that is, the timing time reaches the predetermined time) to control the main power transistor to be turned off. In addition, timing circuit 2 can be controlled by the rising edge of the inverted signal of switching control signal PWM to reset and restart timing. That is, timing circuit 2 may be controlled to start timing from zero when the main power transistor is turned off in each switching period, and when the timing time reaches the predetermined time, clock signal CLK can be activated.

Figure 9:
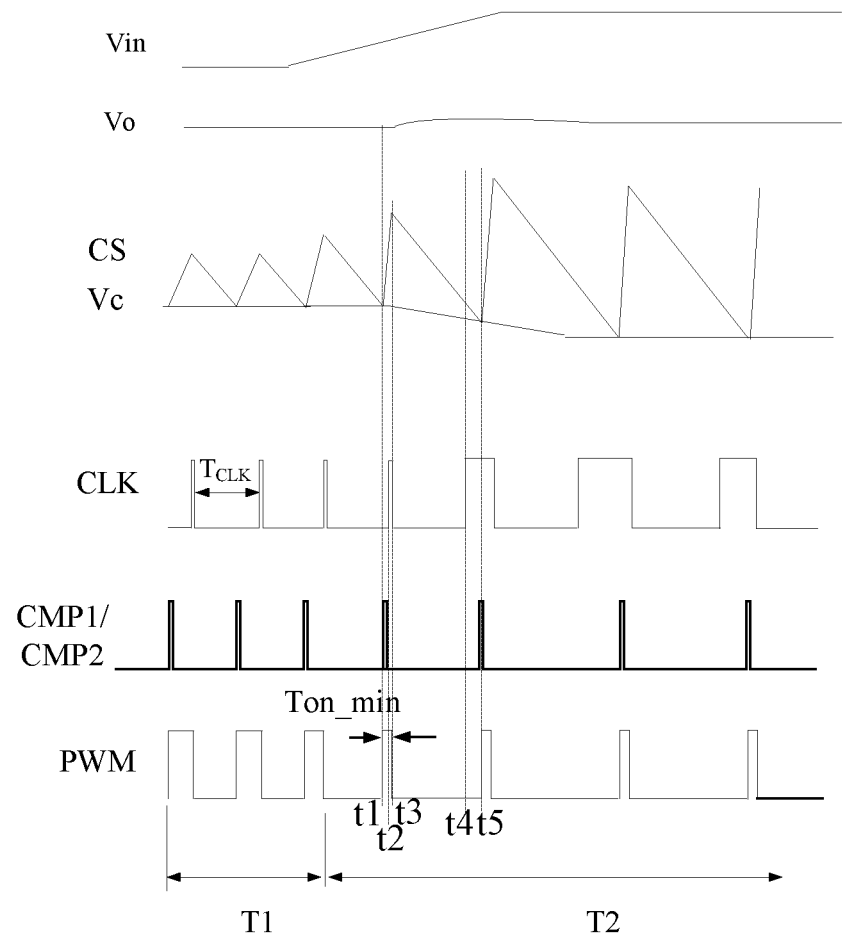
FIG. 9 is a waveform diagram of example operation of the third control circuit with the minimum turn-on time, in accordance with embodiments of the present invention.

Referring now to FIG. 9, shown is waveform diagram of example operation of the third control circuit with the minimum turn-on time, in accordance with embodiments of the present invention. As above, the switching period is divided into intervals T1 and T2. In interval T1, the buck converter operates in the fixed frequency mode (i.e., the first operation state), while in interval T2, the buck converter operates in the variable frequency mode (i.e., the second operation state). In interval T1, when switching control signal PWM goes from high to low, timing circuit 2 may start timing, and when current sampling signal CS is less than compensation signal Vc, set signal set can be generated to set switching control signal PWM to be at a high level to turn on the main power transistor, and thus the inductor current can rise. When the timing time reaches the predetermined time, clock signal CLK may be active. Since the turn-on time of the main power transistor is greater than minimum turn-on time Ton_min at this time, minimum on-time detection signal VT1 can be active, and since current sampling signal CS is greater than compensation signal Vc at this time, comparison signal CMP1 can be inactive. Thus, reset signal rst can be active to reset switching control signal PWM. That is, in interval T1, the turn-off moment of the main power transistor can be controlled by clock signal CLK, and the turn-on moment of the main power transistor may be determined by the comparison result of the current sampling signal and the compensation signal. For example, the main power transistor can be controlled to be turned on when current sampling signal CS is less than compensation signal Vc.

As input voltage Vin increases to much greater than output voltage Vo, the buck converter enters interval T2. One switching period is taken as an example here. At time t1, when switching control signal PWM is at a high level, the main power transistor can be turned on, and the inductor current can increase. When the timing time of timing circuit 2 reaches the preset time, that is, at time t2, clock signal CLK can be active. However, the turn-on time may not have yet reached minimum turn-on time Ton_min, so the main power transistor may remain turned on, such that current sampling signal CS can continue to rise, and clock signal CLK may remain active. At time t3, minimum on-time detection signal VT1 can be active. Since current sampling signal CS is greater than compensation signal Vc at this time, comparison signal CMP1 can be inactive, and inverted signal CMP1' active, so switching control signal PWM can be at a low level to control the main power transistor to be turned off. At the same time, clock signal CLK can be low, and then timing circuit 2 may be reset. After that, current sampling signal CS can begin to drop.

Since the time for current sampling signal CS to drop to less than compensation signal Vc becomes longer, current sampling signal CS may remain greater than compensation signal Vc when clock signal CLK is active at time t4, so clock signal CLK may not trigger switching control signal PWM to be reset, and the switching period becomes longer. Until time t5, when current sampling signal CS drops below compensation signal Vc, comparison signal CMP2 can be active, and then set signal set may be active, such that switching control signal PWM goes high to control the main power transistor to be turned on. As shown, the switching frequency gradually decreases, and finally output voltage Vo may return to the steady state. That is, in interval T2, the turn-on moment of the main power transistor can be determined by the comparison result of the current sampling signal and the compensation signal. For example, the main power transistor can be controlled to turn on when current sampling signal CS is less than compensation signal Vc. The turn-off moment of the main power transistor can be controlled by minimum turn-on time Ton_min, which may be equivalent to shielding clock signal CLK. For example, the main power transistor can be controlled to be turned off when the turn-on time reaches minimum on-time Ton_min.

Figure 10:
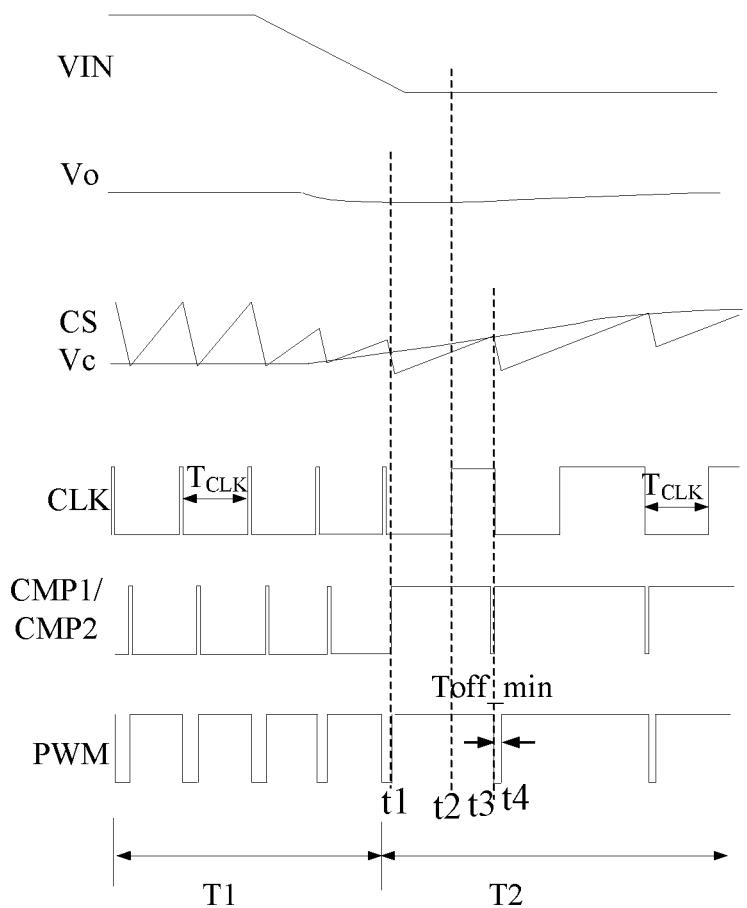
FIG. 10 is a waveform diagram of example operation of the third control circuit with the minimum turn-off time, in accordance with embodiments of the present invention.

Referring now to FIG. 10, shown is a waveform diagram of example operation of the third control circuit with the minimum turn-off time, in accordance with embodiments of the present invention. As above, the switching period is divided into intervals T1 and T2. In interval T1, the buck converter operates in the fixed frequency mode (i.e., the first operation state); in interval T2, the buck converter operates in the variable frequency mode (i.e., the third operation state). In interval T2, initially, since the buck converter may only operate with minimum off-time Toff_min, output voltage Vo can decrease, such that feedback signal Vfb decreases, and compensation signal Vc increases. Taking one switching cycle as an example, at time t1, switching control signal PWM may be at a high level, the main power transistor can be turned on, and then the inductor current can rise. Since input voltage Vin and output voltage Vo are relatively close at this time, the rising slope of current sampling signal CS can decrease. At time t2, the timing time may reach the predetermined time, and thus clock signal CLK can be active. However, current sampling signal CS may remain less than compensation signal Vc at this time, so comparison signal CMP1 can be active, and inverted signal CMP1' inactive, and reset signal rst may not be triggered.

Thus, the main power transistor may remain turned on, and clock signal CLK may remain active, resulting in the increase of the switching period. Until time t3, when current sampling signal CS rises to be greater than compensation signal Vc, comparison signal CMP1 can be inactive, and then reset signal rst may be generated to control switching control signal PWM to be at a low level to turn off the main power transistor. Also here, the timing circuit can be cleared and restarts timing. After that, current sampling signal CS can be less than compensation signal Vc, so comparison signal CMP2 may be active. At time t4, the turn-off time of the main power transistor reaches minimum turn-off time Toff_min, so set signal set can be generated to set switching control signal PWM to be at a high level to turn on the main power transistor. That is, in interval T2, the turn-off moment of the main power transistor may be determined by the comparison result between the current sampling signal and the compensation signal. For example, the main power transistor can be controlled to be turned off when current sampling signal CS is greater than compensation signal Vc. The main power transistor can be controlled to be turned on when the turn-off time reaches minimum turn-off time Toff_min.

Figure 11:
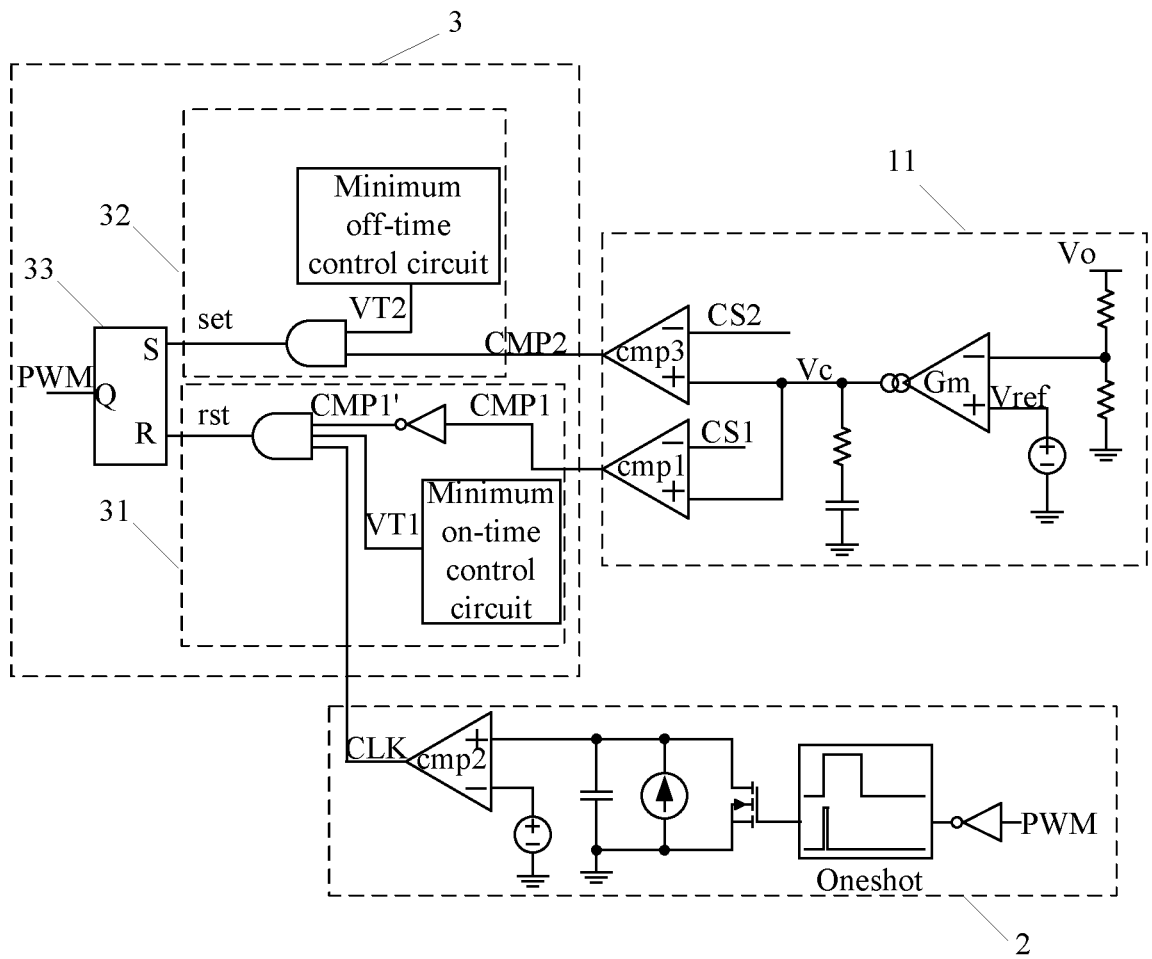
FIG. 11 is a circuit diagram of a fourth example control circuit, in accordance with embodiments of the present invention.

Referring now to FIG. 11, shown is circuit diagram of a fourth example control circuit, in accordance with embodiments of the present invention. In this particular example, the inductor current can be characterized by sampling the current flowing through the power transistor. For example, during the turn-on period of the main power transistor of the buck converter (e.g., the rising stage of inductor current iL), the current flowing through the main power transistor can be sampled to obtain current sampling signal CS1. During the turn-on period of the synchronous power transistor of the buck converter (e.g., the falling stage of inductor current iL), the current flowing through the synchronous power transistor may be sampled to obtain current sampling signal CS2, such that inductor current iL can be characterized according to current sampling signals CS1 and CS2 together.

As shown, current control circuit 11 can include error amplifier Gm, comparator cmp1, and comparator cmp3. For example, error amplifier Gm can obtain the error between feedback signal Vfb and reference signal Vref, and may generate compensation signal Vc at the output terminal after compensation. Comparator cmp1 can compare current sampling signal CS1 against compensation signal Vc to generate comparison signal CMP1, where comparison signal CMP1 is active when current sampling signal CS1 is less than compensation signal Vc. Comparator cmp2 can compare current sampling signal CS2 against compensation signal Vc to generate comparison signal CMP2, where comparison signal CMP2 is active when current sampling signal CS2 is less than compensation signal Vc.

Figure 12:
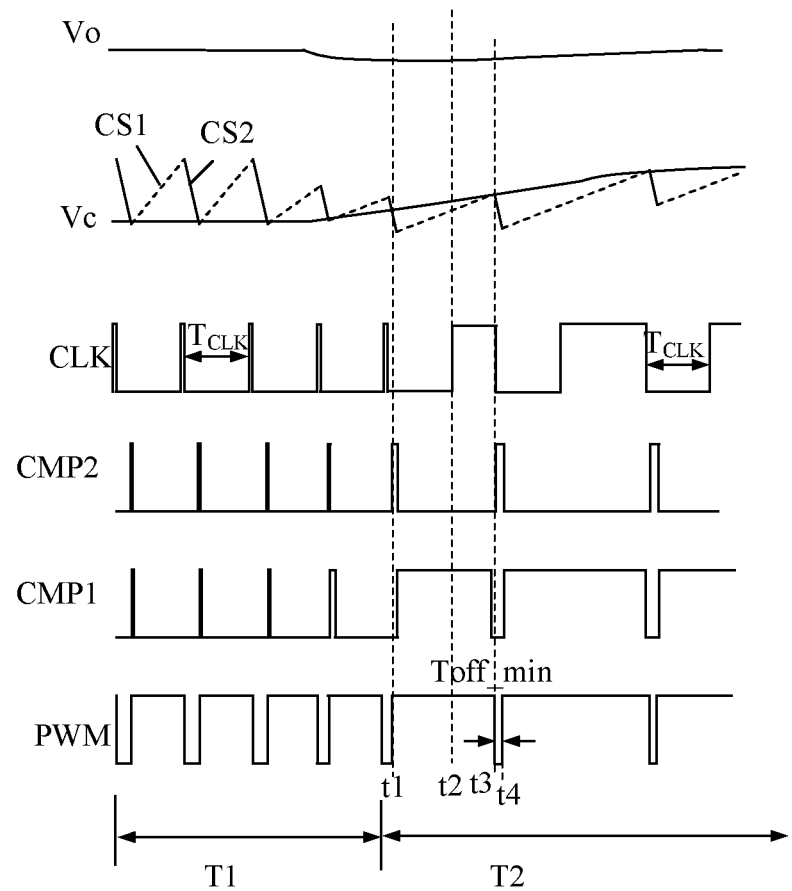
FIG. 12 is a waveform diagram of example operation of the fourth control circuit with the minimum turn-off time, in accordance with embodiments of the present invention.

Referring now to FIG. 12, shown is a waveform diagram of example operation of the fourth control circuit with the minimum turn-off time, in accordance with embodiments of the present invention. In this particular example, current sampling signal CS can include current sampling signal CS1 (indicated by a dotted line) and current sampling signal CS2 (indicated by a solid line). Also, comparison signal CMP1 can be active when current sampling signal CS1 is less than compensation signal Vc, and comparison signal CMP2 may be active when current sampling signal CS2 is less than compensation signal Vc. As above, the full process is divided into interval T1 for fixed frequency operation (i.e., the first operation state) and interval T2 for variable frequency operation (i.e., the third operation state).

In interval T1, when current sampling signal CS1 is less than compensation signal Vc, comparison signal CMP1 can be active, and minimum off-time detection signal VT2 may be active at this time, so switching control signal PWM may be at a high level to turn on the main power transistor, and then the inductor current can increase. When the timing time reaches the predetermined time, clock signal CLK can be active. At this time, current sampling signal CS2 is greater than compensation signal Vc, so comparison signal CMP2 can be inactive, and minimum on-time detection signal VT1 may be active, so reset signal rst can be generated to reset switching control signal PWM. At the same time, clock signal CLK may be reset to restart timing, and the inductor current can decrease.

In interval T2, at time t1, switching control signal PWM can be set high to turn on the main power transistor, and the inductor current may increase. Since input voltage Vin and output voltage Vo are relatively close, the rising slope of current sampling signal CS1 can decrease. At time t2, the timing time may reach the predetermined time, and thus clock signal CLK can be active. However, current sampling signal CS1 may remain less than compensation signal Vc at this time, so comparison signal CMP1 can be active, and the inverted signal CMP1' inactive, such that reset signal rst may not be generated. Thus, the main power transistor may remain turned on, and clock signal CLK may remain active, resulting in the increase of the switching period. Until time t3, when current sampling signal CS1 rises to be greater than the compensation signal Vc, the reset signal rst can be generated, and switching control signal PWM can go low to turn off the main power transistor. After that, current sampling signal CS2 may be less than compensation signal Vc, and thus comparison signal CMP2 can be active. At time t4, the turn-off time of the main power transistor can reach minimum turn-off time Toff_min. Thus, set signal set may be generated, in order to set switching control signal PWM to be at a high level to control the main power transistor to be turned on. That is, in interval T2, the turn-off moment of the main power transistor can be determined by the comparison result of the current sampling signal and the compensation signal. For example, the main power transistor can be controlled to be turned off when current sampling signal CS1 is greater than compensation signal Vc. Also, the main power transistor may be turned on when the turn-off time reaches minimum turn-off time Toff_min.

In this way, regardless of whether sampling the current flowing through the power transistor or obtaining the current sampling signal that is synchronized with the inductor current in the whole switching period may not have any substantial effect on the control. In particular embodiments, the turn-on moment and turn-off moment of the power transistor may all be controlled by the comparison result of the compensation signal representing the error signal and the current sampling signal, and the clock signal can be generated based on the switching control signal, such that adaptive frequency reduction may be realized under the limit of the minimum turn-on time to achieve a smaller duty cycle. Also, adaptive frequency reduction can be realized under the limit of the minimum turn-off time, in order to achieve a larger duty cycle.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A control circuit for a switching converter, wherein:
   a) in a first operation state, the control circuit is configured to control a switching period of the switching converter to remain unchanged, to control a turn-on time of a power transistor in the switching converter to be not less than a minimum turn-on time in each switching period, and to control a turn-off time of the power transistor to be not less than a minimum turn-off time,
   b) in a second operation state, the control circuit is configured to control the turn-on time of the power transistor to be the minimum turn-on time in each switching period, and to adjust the switching period to further reduce a duty cycle;
   c) in a third operation state, the control circuit is configured to control the turn-off time of the power transistor to be the minimum turn-off time in each switching period, and to adjust the switching period to further increase the duty cycle;
   d) the control circuit comprises a feedback control circuit configured to control the power transistor to be turned on according to a compensation signal and a current sampling signal representing an inductor current of the switching converter, and to control the power transistor to be turned off according to the compensation signal and the current sampling signal, wherein the compensation signal is generated based on an error of a feedback signal representing an output voltage of the switching converter and a reference signal;
   e) the feedback control circuit comprises a current control circuit configured to compensate for the error between the feedback signal and the reference signal to generate the compensation signal, and to generate first and second comparison signals by comparing the compensation signal against the current sampling signal; and
   f) the feedback control circuit comprises a pulse-width modulation (PWM) generation circuit configured to generate a switching control signal to control the power transistor to be turned on and off according to the first comparison signal, the second comparison signal, the clock signal, the minimum turn-on time, and the minimum turn-off time.

2. The control circuit of claim 1, further comprising a timing circuit configured to generate a clock signal after a timing time reaches a predetermined time in each switching period and transmit the clock signal to the feedback control circuit, wherein the timing time is cleared at the beginning of each switching period, and the predetermined time represents the switching period in the first operation state.

3. The control circuit of claim 2, wherein:
   a) when the power converter is in the first operation state, the power transistor is controlled to be turned on and off according to the clock signal and a comparison result of the current sampling signal and the compensation signal;
   b) when the power converter is in the second operation state, the power transistor is controlled to be turned on and off according to the comparison result and the minimum turn-on time; and
   c) when the power converter is in the third operation state, the power transistor is controlled to be turned on and off according to the comparison result and the minimum turn-off time.

4. The control circuit of claim 2, wherein:
   a) when the switching converter is controlled under a peak current mode, in the first operation state, the control circuit is configured to control the power transistor to be turned on by the clock signal, and to be turned off by a comparison result of the current sampling signal and the compensation signal; and b) when the switching converter is controlled under a valley current mode, in the first operation state, the control circuit is configured to control the power transistor to be turned off by the clock signal, and to be turned on by the comparison result of the current sampling signal and the compensation signal.

5. The control circuit of claim 2, wherein:

a) in the second operation state, the control circuit is configured to control the power transistor to be turned on by a comparison result of the current sampling signal and the compensation signal, and to be turned off when the turn-on time of the power transistor reaches the minimum turn-on time; and b) in the third operation state, the control circuit is configured to control the power transistor to be turned off by the comparison result of the current sampling signal and the compensation signal and to be turned on when the turn-off time of the power transistor reaches the minimum turn-off time.

6. The control circuit of claim 2, wherein the timing circuit comprises:

a) a ramp generation circuit configured to charge a capacitor using a current source to generate a ramp voltage across the capacitor to characterize the timing time, wherein the ramp voltage is cleared when the power transistor is turned on in each switching period; and b) a comparison circuit configured to compare the ramp voltage to a threshold signal representing the predetermined time to generate the clock signal, wherein the clock signal is active when the ramp voltage is greater than the threshold signal.

7. The control circuit of claim 1, further comprising a current sampling circuit configured to obtain the current sampling signal that changes synchronously with the inductor current of the switching converter in the whole switching period.

8. The control circuit of claim 7, wherein the current sampling circuit is configured to sample the inductor current in the switching converter to obtain the current sampling signal, or to generate a triangular wave signal that changes synchronously with the inductor current in the switching converter as the current sampling signal.

9. The control circuit of claim 7, wherein the first comparison signal and the second comparison signal are the same signal.

10. The control circuit of claim 1, further comprising a current sampling circuit configured to sample a current flowing through the power transistor in the switching converter to obtain the current sampling signal, wherein the current sampling signal comprises a first current sampling signal representing the inductor current in a rising stage and a second current sampling signal representing the inductor current in a falling stage.

11. The control circuit of claim 10, wherein the current control circuit is configured to compare the compensation signal against the first current sampling signal to generate the first comparison signal, and to compare the compensation signal against the second current sampling signal to generate the second comparison signal.

12. The control circuit of claim 1, wherein the PWM generation circuit comprises:

a) a reset signal generation circuit configured to generate a reset signal according to the first comparison signal, in order to control the power transistor to be turned on; and b) a set signal generation circuit configured to generate a set signal according to the second comparison signal, in order to control the power transistor to be turned off.

13. The control circuit of claim 12, wherein the reset signal generation circuit is configured to:

a) generate the reset signal when the first comparison signal is active and the turn-on time of the power transistor is not less than the minimum turn-on time; and b) generate the set signal generation circuit is configured to generate the set signal when the second comparison signal is inactive, the turn-off time of the power transistor is not less than the minimum turn-off time, and the timing time reaches the predetermined time.

14. The control circuit of claim 13, wherein:

a) the first and second comparison signals are active when the current sampling signal that changes synchronously with the inductor current in the whole switching period is greater than the compensation signal; and b) when the current sampling signal that changes synchronously with the inductor current in the whole switching period is less than the compensation signal, the first and second comparison signals are inactive.

15. The control circuit of claim 13, wherein:

a) when the first current sampling signal representing the inductor current in the rising stage is greater than the compensation signal, the first comparison signal is active;

b) when the first current sampling signal is less than the compensation signal, the first comparison signal is inactive;

c) when the second current sampling signal representing the inductor current in the falling stage is greater than the compensation signal, the second comparison signal is active; and d) when the second current sampling signal is less than the compensation signal, the second comparison signal is inactive.

16. The control circuit of claim 13, wherein:

a) the set signal generation circuit is configured to generate a set signal when the second comparison signal is active and the turn-off time of the power transistor is not less than the minimum turn-off time; and b) the reset signal generation circuit is configured to generate a reset signal when the first comparison signal is inactive, the turn-on time of the power transistor is not less than the minimum turn-on time, and the timing time reaches the predetermined time.

17. The control circuit of claim 16, wherein:

a) when the current sampling signal representing the inductor current of the whole switching period is less than the compensation signal, the first and second comparison signals are active; and b) when the current sampling signal representing the inductor current of the whole switching period is greater than the compensation signal, the first and second comparison signals are inactive.

18. The control circuit of claim 16, wherein:

a) when the first current sampling signal representing the inductor current in the rising stage is less than the compensation signal, the first comparison signal is active;

b) when the first current sampling signal is greater than the compensation signal, the first comparison signal is inactive;

c) when the second current sampling signal representing the inductor current in the falling stage is less than the compensation signal, the second comparison signal is active; and d) when the second current sampling signal is greater than the compensation signal, the second comparison signal is inactive.

19. The control circuit of claim 1, wherein the switching converter is a buck converter.

20. A method of controlling a switching converter, the method comprising:

a) in a first operation state, controlling a switching period of the switching converter to remain unchanged, controlling turn-on time of a power transistor in the switching converter to be not less than a minimum turn-on time in each switching period, and controlling a turn-off time of the power transistor to be not less than a minimum turn-off time;

b) in a second operation state, controlling the turn-on time of the power transistor to be the minimum turn-on time in each switching period, and adjusting the switching period to further reduce a duty cycle;

c) in a third operation state, controlling the turn-off time of the power transistor to be the minimum turn-off time in each switching period, and adjusting the switching period to further increase the duty cycle;

d) when the power converter is in the first operation state, controlling the power transistor to be turned on and off according to a clock signal and a comparison result between a current sampling signal and a compensation signal, wherein the clock signal is activated when a timing time for the switching period reaches a predetermined time;

e) when the switching converter is controlled under a peak current mode, in the first operation state, controlling the power transistor to be turned on by the clock signal, and to be turned off by the comparison result; and f) when the switching converter is controlled under a valley current mode, in the first operation state, controlling the power transistor to be turned off by the clock signal, and to be turned on by the comparison result.

21. The method of claim 20, further comprising:

a) controlling the power transistor to be turned on at least according to the compensation signal and the current sampling signal representing an inductor current of the switching converter; and b) controlling the power transistor to be turned off at least according to the compensation signal and the current sampling signal, wherein the compensation signal is generated based on an error of a feedback signal representing an output voltage of the switching converter and a reference signal.

22. The method of claim 20, further comprising:

a) when the power converter is in the second operation state, controlling the power transistor to be turned on and off according to a comparison result of the current sampling signal and the compensation signal and the minimum turn-on time; and b) when the power converter is in the third operation state, controlling the power transistor to be turned on and off according to the comparison result and the minimum turn-off time.

23. The method of claim 22, further comprising:

a) in the second operation state, controlling the power transistor to be turned on by the comparison result, and to be turned off when the turn-on time of the power transistor reaches the minimum turn-on time; and b) in the third operation state, controlling the power transistor to be turned off by the comparison result and to be turned on when the turn-off time of the power transistor reaches the minimum turn-off time.

* * * * *